United States Patent [19]

Ohashi et al.

[11] Patent Number: 5,128,288

[45] Date of Patent: Jul. 7, 1992

[54] PHOSPHATE COMPOUNDS, SINTERED BODIES THEREOF AND MANUFACTURE OF THE SINTERED BODIES

[75] Inventors: Tsuneaki Ohashi, Ohgaki; Keiji Matsuhiro, Nagoya, both of Japan

[73] Assignee: NGK Insulators, Ltd., Japan

[21] Appl. No.: 627,412

[22] Filed: Dec. 14, 1990

[30] Foreign Application Priority Data

Jan. 11, 1990 [JP] Japan ................... 2-4329

[51] Int. Cl.[5] .................. C04B 35/48; C04B 35/49; C04B 35/02
[52] U.S. Cl. ........................ 501/104; 501/94; 501/102; 501/103
[58] Field of Search ............... 501/94, 102, 103, 104, 501/105

[56] References Cited

U.S. PATENT DOCUMENTS

| | | | |
|---|---|---|---|
| 4,751,206 | 6/1988 | Yamai et al. | 501/102 |
| 4,801,566 | 1/1989 | Limaye et al. | 501/104 |
| 4,883,781 | 11/1989 | Watanabe et al. | 501/102 |
| 4,888,312 | 12/1989 | Watanabe et al. | 501/102 |
| 4,925,816 | 5/1990 | Watanabe et al. | 501/104 |
| 4,968,648 | 11/1990 | Watanabe et al. | 501/104 |

OTHER PUBLICATIONS

International Tables for X-Ray Crystallography vol. 1, p. 275.

Communications of the American Ceramic Society 70 [10] C-232 C-236 (1987).
Annual Meeting Abstracts, The American Ceramic Society, 91st Annual meeting and Exposition, Annual Meeting Abstracts, Apr. 23-27, 1989, Indianapolis, Indiana, p. 200, *Synthesis and Low Thermal Expansion Behavior of NaZr$_2$(PO$_4$)$_3$-Type Structure Zirconium Phosphates*, T. Ohashi et al.

*Primary Examiner*—William R. Dixon, Jr.
*Assistant Examiner*—Michael Marcheschi
*Attorney, Agent, or Firm*—Parkhurst, Wendel & Rossi

[57] ABSTRACT

A heat resistant, low expansion phosphate compound and sintered bodies thereof, having a composition of $RZr_4P_6O_{24}$ (R is one or more cations of IIa group in the periodic table, such as Ba, Sr and Ca): an average thermal expansion coefficient between room temperature and 1,400° C. of $-10 \sim +10 \times 10^{-7}$/°C.; and having a high temperature type crystalline structure having R3c symmetry at room temperature. The sintered body of the invention can be manufactured by mixing and shaping starting materials, firing the resulting shaped body at 1,400° C. $\sim$ 1,700° C. to provide a sintered body with a composition of $RZr_4P_6O_{24}$ and then, keeping the obtained sintered body at a high temperature of not lower than a temperature of phase transition between a high temperature type and a low temperature type crystalline structure, followed by quenching.

11 Claims, 5 Drawing Sheets

FIG. 1

FIG_2

FIG_3

FIG_4

FIG. 5

PHOSPHATE COMPOUNDS, SINTERED BODIES THEREOF AND MANUFACTURE OF THE SINTERED BODIES

BACKGROUND OF THE INVENTION

1. Field of the Invention

The present invention relates to heat resistant phosphate compounds, sintered bodies thereof and a manufacturing process of such sintered bodies. More particularly, the present invention relates to heat resistant phosphate compounds having very excellent low-expansibility and thermal shock resistance, sintered bodies of such a phosphate compound, and a process for manufacturing such sintered bodies.

2. Description of the Prior Art

In recent years, a demand for materials excellent in heat resistance and low thermal expansion properties has been increasing with the progress of industrial technology. Under such a demand, it has been recognized that zirconyl phosphate $[(ZrO)_2P_2O_7]$ is promising as an excellent heat resistant and low expansion material.

Further, alkaline earth metal phosphate compounds with a specific composition have been proposed as low expansion compounds (Communications of the American Ceramic Society 70 [10] C-232 C-236 (1987) and the specification of U.S. Pat. No. 4,801,566).

However, it has been pointed out that phosphate compounds such as zirconyl phosphate or the like, although having an excellent low expansion property, are pyrolyzed at a high temperature of 1,200° C. or more and phosphorus (P) evaporates. For example, there is a problem that after exposure to heat at 1,400° C. for 100 hours, zirconyl phosphate exhibits an ignition loss of 19% and sodium zirconium phosphate exhibits that of not less than 36%.

SUMMARY OF THE INVENTION

We, the inventors, have extensively studied to solve the problems with the above-described conventional technology and found that phosphate compounds having a composition of a high temperature type $RZr_4P_6O_{24}$ (R is one or more cations of IIa group in the periodic table) and having a crystalline structure of $R\bar{3}c$ symmetry exhibit a low expansion property with substantially no thermal expansion nor contraction and, moreover, these phosphate compounds having a composition of a high temperature type $RZr_4P_6O_{24}$ can be obtained by keeping an $RZr_4P_6O_{24}$ sintered body at its phase transition temperature or higher, followed by quenching. Thus, the present invention has been accomplished.

Namely, according to the present invention, there are provided phosphate compounds characterized by having a composition of $RZr_4P_6O_{24}$ (R is one or more cations of IIa group in the periodic table), an average thermal expansion coefficient between room temperature and 1,400° C. of $-10 \sim +10 \times 10^{-7}/°$ C. and a high temperature type crystalline structure having $R\bar{3}c$ symmetry at room temperature. Further, the present invention provides heat resistant phosphate sintered bodies characterized by comprising at least one of such phosphate compounds as a main crystalline phase.

Furthermore, according to the present invention, there is provided a process for manufacturing the phosphate sintered bodies, which is characterized in that starting material powders are mixed and shaped, the resulting shaped body is fired at a temperature between 1,400° C. and 1,700° C. to obtain a sintered body having a composition of $RZr_4P_6O_{24}$ (R is on or more cations of IIa group in the periodic table) and then the obtained sintered body is kept at a high temperature of not lower than the temperature of phase transition between the high temperature type and the low temperature type (for example, about 1,200° C. for $SrZr_4P_6O_{24}$ and about 900° C. for $BaZr_4P_6O_{24}$), followed by quenching.

BRIEF DESCRIPTION OF THE DRAWINGS

The invention will now be described with reference to the accompanying drawings wherein.

DESCRIPTION OF THE PREFERRED EMBODIMENTS

In the present invention, by keeping a temperature at which a high temperature type $RZr_4P_6O_{24}$ (R is one or more cations of IIa group in the periodic table) remains stable, i.e., a temperature of not lower than the phase transition temperature between the high temperature type and the low temperature type, and then quenching, the high temperature phase is allowed to exist at a temperature at which thermodynamically the low temperature phase is stable.

A residual quantity of the high temperature phase depends mainly upon quenching conditions, such as a cooling rate, a cooling temperature, the size and shape of the sintered bodies, or the like, and the heat-treating temperature. The residual quantity will increase as the cooling rate is higher, for example, when the heat-treating temperature is high, the cooling temperature is low, the quenching is conducted in water or oil, or the like. The sintered bodies become lower expansion as the residual quantity of the high temperature phase increases. That is because the high temperature type $RZr_4P_6O_{24}$ exhibits an ultra-low expansion property with substantially no expansion nor contraction.

The phosphate compounds according to the present invention have basically a composition of $RZr_4P_6O_{24}$ (R is one or more cations of IIa group in the periodic table) and a high temperature type crystalline structure having $R\bar{3}c$ symmetry at room temperature. This high temperature type crystalline structure is the crystalline structure of $R\bar{3}c$ symmetry shown in International Tables for X-Ray Crystallography, Vol.I, p.275 (edited by N. F. M. Henry and K. Lonsdale, published by the Kynoch Press, Birmingham, England, 1969).

R is a cation belonging to IIa group in the periodic table and preferred to consist of at least one of barium (Ba), strontium (Sr) and calcium (Ca).

The phosphate compounds and sintered bodies according to the present invention have an extremely low thermal expansion, i.e., an average thermal expansion coefficient at room temperature up to 1,400° C. of $-10 \sim +10 \times 10^{-7}/°$ C., and an excellent thermal shock resistance. Therefore, the sintered bodies having such characteristics according to the present invention can be employed particularly preferably as a material that requires heat resistance and heat stability at high temperatures, such as 1 ceramic honeycomb structures as supports for motor vehicle exhaust gas cleaning catalysts, heat exchangers, supports for catalytic combustion, or the like; 2 housings or gas trunks of turbochargers, GT engines, or the like; and 3 insulating members for exhaust gas port liners, or the like.

Next, in the process for manufacturing the phosphate sintered bodies according to the present invention, the feature lies in that starting material powders are mixed, shaped and fired, and then the resulting sintered body is kept at a high temperature of not lower than the phase transition temperature between the high temperature type and the low temperature type, followed by quenching.

According to this process, the high temperature type $RZr_4P_6O_{24}$ is allowed to exist at a temperature at which thermodynamically the low temperature type $RZr_4P_6O_{24}$ is stable.

As a starting material, preferably employed is a batch mixture comprising $(ZrO)_2P_2O_7$, $ZrP_2O_7$ and, RO and/or R-phosphate. Each of the above compounds is stable, hardly causes unevenness during shaping and firing steps, and can be fired at high temperatures. Alternatively, in the case where hitherto employed phosphoric acid is used as a $P_2O_5$ source for the starting material, since phosphoric acid is a liquid, it becomes uneven during mixing to form localized, highly concentrated phosphorus portions, resulting in low melting compounds at the calcining step.

As one of the starting material components: RO, stable compounds, such as hydroxides, carbonates, sulfates and the like, which can be converted into RO i.e. oxides, during firing, can be selected and employed.

The average particle diameter of the starting powder is generally at most 50 μm, preferably at most 10 μm.

As firing conditions of the sintered bodies according to the present invention, the firing temperature is 1,400°~1,700° C. and the firing time is 1~24 hours, preferably 2~10 hours. With a firing temperature in the range between 1,400° C. and 1,700° C., sintered bodies according to the present invention wherein the starting powders have been sufficiently sintered can be obtained. Further, if the firing time is less than 1 hour, the sintering will be insufficient, while if it exceeds 24 hours, strength reduction will be caused by abnormal grain growth and, moreover, a heterogeneous phase will separate out due to evaporation of phosphorus.

In the next place, the sintered bodies obtained by firing are kept at a high temperature of not lower than the phase transition temperature between the high temperature type and the low temperature type (heat-treating step). According to this heat-treating step, the composition of the sintered bodies is modified to a high temperature type $RZr_4P_6O_{24}$. Then, these sintered bodies are quenched. Through the quenching step, phosphate sintered bodies having a high temperature type $R_yZr_4P_6O_{24}$ composition at normal temperature can be obtained wherein the high temperature type $RZr_4P_6O_{24}$ is not phase-transited to the low temperature type.

In the present invention, the residual quantity of the high temperature type $R_yZr_4P_6O_{24}$ depends upon conditions of the above-described heat-treating and quenching steps. Namely, the higher the cooling rate, the more the residual quantity. The quenching operation of the sintered bodies is conducted at a cooling rate of usually at least 400° C./min., preferably at least 1,000° C./min., by means of quenching in water, oil, blowing gas, or the like.

The present invention will be further explained by way of example hereinafter. It should be clearly understood that the present invention is not limited by these examples.

EXAMPLES 1-9 AND COMPARATIVE EXAMPLES 10-13

Starting powders with compositions shown in Table 1 (chemical analysis values are shown in Table 3) of which particle size was previously controlled by an oscillating mill charged with zirconia pebbles of about 5 mm diameter as shown in Table 2, were compounded together. In the Examples, the particle size control was conducted by pulverizing with the oscillating mill; however, pot mills, attritors or the like also can be used.

Then, the above compounds were mixed with water, dried in a desiccator and pulverized with a mortar.

To 100 parts by weight of each compound were added 5 parts by weight of a 10% PVA (polyvinyl alcohol) aqueous solution and mixed thoroughly. The mixtures were press-molded under a pressure of 300 kg/cm$^2$ with a mold of 25 mm $\times$ 80 mm $\times$ 6 mm and then rubber-bag-pressed under a pressure of 2 tons/cm$^2$, followed by drying in a desiccator. These molded bodies were fired in air in an electric furnace under the conditions shown in Table 1. The temperature increase rate was 5~1,000° C./hr and the temperature decrease rate was 5~1,000° C./hr with the exception of Example 7 in which the body as fired was quenched.

Then, these sintered bodies were machined to test-pieces of 3 mm $\times$ 4 mm $\times$ 40 mm as shown in JIS R-1601 (1981) and heat-treated in air in an electric furnace under the conditions shown in Table 1. The temperature increase rate was 5~1,000° C./hr and the cooling was conducted under the conditions shown in Table 1.

After the above-described heat treatment, open voids (by Archimedean method), 4-point flexural strength [according to JIS R-1601(1981)], thermal expansion coefficient and melting point of the test-pieces were determined. For the determination of the thermal expansion coefficient, a push bar differential thermodilatometer with a highly pure alumina sintered body was used to measure thermal expansion from 40° C. up to 1,400° C., and the coefficient was found from the value of the thermal expansion (from 40° C. to 1,400° C.) divided by 1,360. Further, as regards the melting point, the sintered bodies machined to rectangular prisms of 3 mm $\times$ 4 mm $\times$ 5 mm were retained in the electric furnace, the temperature was increased at a rate of 10° C./min up to 1,700° C. and then non-melting and melting were confirmed by visual observation. These results are shown in Table 1.

Furthermore, the quantitative interrelation between the high temperature phase and the low temperature phase in the crystalline phase of the sintered bodies was as follows and the percentages of these phases are shown in Table 1:

(quantitative ratio of high temperature phase to low temperature phase)

Quantity of low temperature phase (%) =

$$\frac{\{I(101) + I(003)\} \text{ of specimen}}{\{I(101) + I(003)\} \text{ of low temperature phase only}} \times 100$$

-continued

Quantity of high temperature phase (%) =

100 − percentage of low temperature phase

Note:
I(101): diffraction intensity by 101 plane;
for example, in BZP, 2θ = 11.1°.
I(003): diffraction intensity by 003 plane;
for example, in BZP, 2θ = 12.4°.

TABLE 1

| | Example | | | | | | |
|---|---|---|---|---|---|---|---|
| | 1 | 2 | 3 | 4 | 5 | 6 | 7 |
| Composition (Wt %) | | | | | | | |
| (ZrO)₂P₂O₇ | 34.2 | 35.8 | | 34.2 | 34.2 | 34.2 | 34.2 |
| ZrP₂O₇ | 48.1 | 50.4 | | 48.1 | 48.1 | 48.1 | 48.1 |
| SrCO₃ | | 13.8 | | | | | |
| BaCO₃ | 17.7 | | 15.8 | 17.7 | 17.7 | 17.7 | 17.7 |
| ZrO₂ | 0 | 0 | 39.5 | 0 | 0 | 0 | 0 |
| BaHPO₄ (Barium hydrogen phosphate) | | | | | | | |
| NH₄H₂PO₄ | 0 | 0 | 44.7 | 0 | 0 | 0 | 0 |
| Firing: | | | | | | | |
| Temperature (°C.) | 1600 | 1600 | 1700 | 1400 | 1600 | 1600 | 1600 |
| Time (h) | 5 | 5 | 1 | 24 | 5 | 5 | 5 |
| Cooling after firing | Conducted | Conducted | Conducted | Conducted | Conducted | Conducted | Not conducted |
| Heat treatment: | | | | | | | |
| Temperature (°C.) | 1400 | 1630 | 1400 | 1000 | 1600 | 1400 | 1400 |
| Time (min.) | 10 | 30 | 10 | 60 | 1 | 10 | 10 |
| Cooling after heat treatment: | | | | | | | |
| Method | Quenching in water | Quenching in water | Quenching in water | Quenching in water | Quenching in oil | Quenching in gas | Quenching in water |
| Temperature (°C.) | 0 | 30 | 10 | 0 | 50 | 30 | 0 |
| Cooling rate (°C./min) | >1000 | >1000 | >1000 | >1000 | >1000 | 400 | >1000 |
| Firing shrinkage (%) | 11 | 16 | 15 | 5 | 11 | 11 | 12 |
| Characteristics of fired body: | | | | | | | |
| Crystal phase at room temperature | BZP | SZP | BZP | BZP | BZP | BZP | BZP |
| High temperature phase content (%) | 100 | 80 | 100 | 70 | 100 | 60 | 100 |
| Low temperature phase content (%) | 0 | 20 | 0 | 30 | 0 | 40 | 0 |
| Open porosity (%) | 25 | 13 | 20 | 41 | 25 | 25 | 26 |
| Flexural strength (kg/cm²) | 390 | 600 | 250 | 120 | 420 | 470 | 400 |
| Thermal expansion coefficient (10⁻⁷/°C., 40-1400° C.) | −2 | 6 | −1 | 8 | −2 | 10 | 0 |
| Melting point (°C.) | >1700 | >1700 | >1700 | >1700 | >1700 | >1700 | >1700 |

| | Example | | Comparative Example | | | |
|---|---|---|---|---|---|---|
| | 8 | 9 | 10 | 11 | 12 | 13 |
| Composition (Wt %) | | | | | | |
| (ZrO)₂P₂O₇ | 35.8 | 35.8 | 34.2 | 34.2 | 34.2 | 35.8 |
| ZrP₂O₇ | 50.4 | 50.4 | 48.1 | 48.1 | 48.1 | 50.4 |
| SrCO₃ | 13.8 | 13.8 | | | | 13.8 |
| BaCO₃ | | | 17.7 | 17.7 | 17.7 | |
| ZrO₂ | | | | | | |
| BaHPO₄ (Barium hydrogen phosphate) | | | | | | |
| NH₄H₂PO₄ | 0 | 0 | | | | |
| Firing: | | | | | | |
| Temperature (°C.) | 1500 | 1650 | 1600 | 1600 | 1600 | 1600 |
| Time (h) | 20 | 5 | 5 | 5 | 5 | 5 |
| Cooling after firing | Conducted | Conducted | Not conducted | Conducted | Conducted | Not conducted |
| Heat treatment: | | | | | | |
| Temperature (°C.) | 1500 | 1650 | — | 500 | 1400 | — |
| Time (min.) | 20 | 5 | — | 30 | 10 | — |
| Cooling after heat treatment: | | | | | | |
| Method | Cooling in gas | Quenching in water | — | Quenching in water | Cooling in air | — |
| Temperature (°C.) | 300 | 0 | — | 0 | 50 | — |
| Cooling rate (°C./min) | >1000 | >1000 | — | >1000 | 5 | — |
| Firing shrinkage (%) | 10 | 21 | 11 | 11 | 11 | 16 |
| Characteristics of | | | | | | |

TABLE 1-continued

| fired body | | | | | | |
|---|---|---|---|---|---|---|
| Crystal phase at room temperature | SZP | SZP | BZP | BZP | BZP | SZP |
| High temperature phase content (%) | 70 | 90 | 0 | 0 | 0 | 0 |
| Low temperature phase content (%) | 30 | 10 | 100 | 100 | 100 | 100 |
| Open porosity (%) | 19 | 4 | 25 | 25 | 25 | 13 |
| Flexural strength (kg/cm$^2$) | 510 | 700 | 480 | 390 | 470 | 700 |
| Thermal expansion coefficient ($10^{-7}$/°C., 40-1400° C.) | 9 | 4 | 23 | 23 | 23 | 26 |
| Melting point (°C.) | >1700 | >1700 | >1700 | >1700 | >1700 | >1700 |

(Note)
BZP: $BaZr_4(PO_4)_6$.
SZP: $SrZr_4(PO_4)_6$

TABLE 2

| | $ZrO_2$ pebbles stabilized with MgO | $ZrO_2$ pebbles stabilized with $Y_2O_3$ |
|---|---|---|
| $SiO_2$ | 0.28 | <0.05 |
| $Al_2O_3$ | 0.037 | <0.02 |
| $Fe_2O_3$ | 0.14 | 0.10 |
| $TiO_2$ | 0.12 | <0.01 |
| CaO | 0.29 | <0.005 |
| MgO | 3.37 | 0.007 |
| $K_2O$ | 0.010 | <0.005 |
| $Na_2O$ | 0.047 | <0.01 |
| $Y_2O_3$ | — | 5.04 |
| $ZrO_2$ | 94.19 | 92.90 |
| $HfO_2$ | 1.65 | 2.11 |
| Total | 100.13 | 100.16 |

TABLE 3

| | Chemical analysis value | | | | | | | | | |
|---|---|---|---|---|---|---|---|---|---|---|
| | $ZrO_2$ | $P_2O_5$ | $SiO_2$ | $Al_2O_3$ | MgO | CaO | NaKO | Ig loss | $Fe_2O_3$ | SrO |
| $(ZrO)_2P_2O_7$ | 61.85 | 36.38 | <0.2 | 0.01 | 0.45 | 0.02 | 0.01 | 3.20 | <0.01 | — |
| $ZrP_2O_7$ | 46.44 | 52.24 | 0.02 | <0.01 | <0.01 | <0.01 | <0.01 | 2.86 | <0.01 | — |
| $SrCO_3$ | — | — | 0.001 | <0.001 | 0.001 | 0.11 | 0.012 | 30.15 | 0.018 | 69.61 |
| $BaCO_3$ | — | — | — | — | — | — | — | 22.30 | <0.01 | — |
| $ZrO_2$ | 98.65 | — | 0.06 | 0.01 | 0.01 | 0.04 | 0.02 | 0.38 | <0.01 | — |
| $NH_4H_2PO_4$ | | 61.08 | | | | | | 38.8 | | |

| | Chemical analysis value | | | | | Average particle |
|---|---|---|---|---|---|---|
| | BaO | $CeO_2$ | $Gd_2O_3$ | $TiO_2$ | $Y_2O_3$ | diameter (μm) |
| $(ZrO)_2P_2O_7$ | — | — | — | — | — | 0.9 |
| $ZrP_2O_7$ | — | — | — | — | — | 1.0 |
| $SrCO_3$ | — | — | — | — | — | 0.6 |
| $BaCO_3$ | 76.50 | — | — | — | — | 10.0 |
| $ZrO_2$ | — | — | — | 0.15 | — | 0.9 |
| $NH_4H_2PO_4$ | | | | | | 5.0 |

As is clear from Examples 1~9 and Comparative Examples 10~13 respectively shown in Table 1, phosphate sintered bodies exhibiting a low expansion property were able to be obtained by keeping phosphate sintered bodies at a high temperature of not lower than the phase transition temperature between the high temperature type and the low temperature type, followed by quenching.

Figure 1:
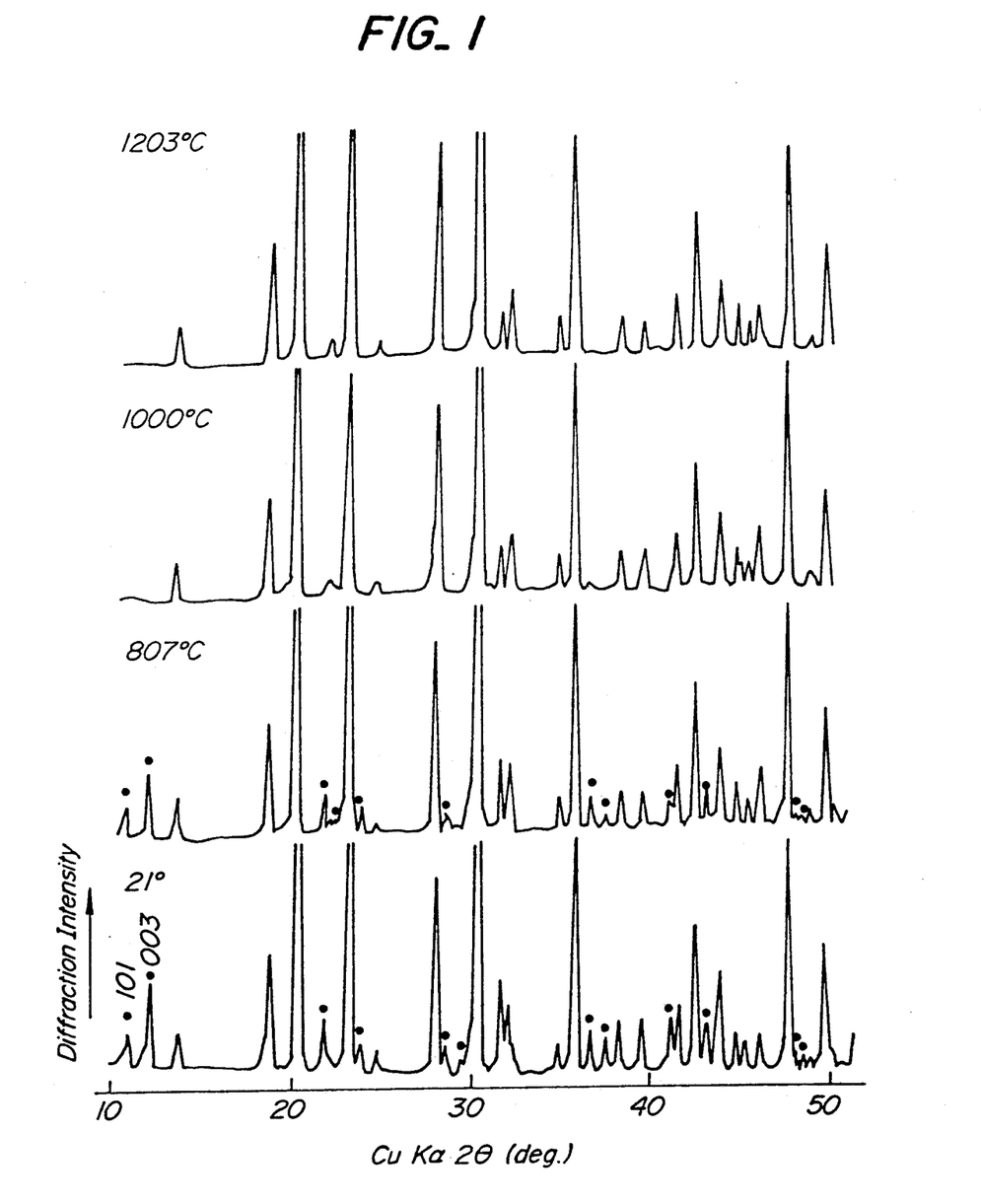
FIG. 1 shows X-ray diffraction patterns of $BaZr_4(PO_4)_6$ crystalline phases of the low temperature type (21° C. and 807° C.) and the high temperature type (1,000° C. and 1,203° C.)
Figure 2:
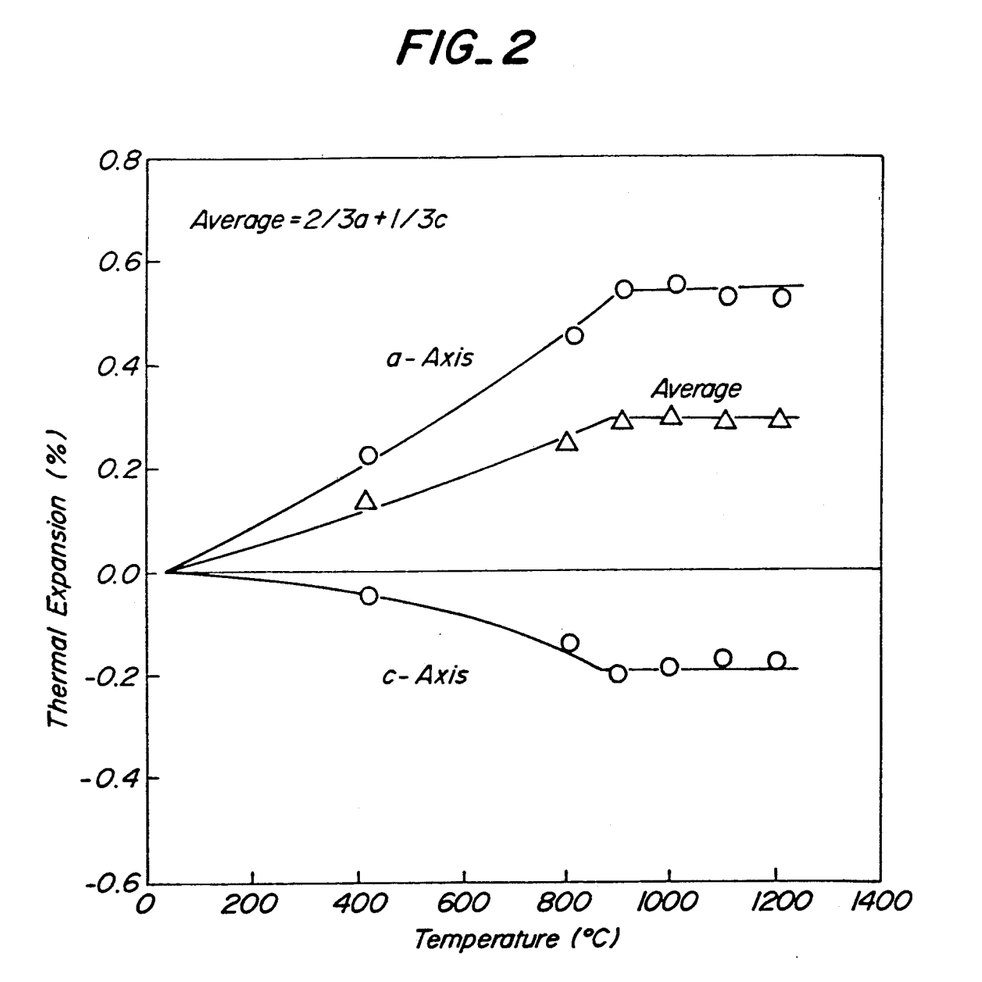
FIG. 2 shows thermal expansion curves of a $BaZr_4(PO_4)_6$ crystal lattice.

Further, in FIG. 1, there are shown X-ray diffraction patterns of $BaZr_4(PO_4)_6$ crystalline phases of the low temperature type (21° C. and 807° C.) and the high temperature type (1,000° C. and 1,203° C.) and in FIG. 2 are shown thermal expansion curves of a $BaZr_4(PO_4)_6$ crystal lattice. In FIG. 2, the a axis and the c axis represent orientation in the case where the $BaZr_4(PO_4)_6$ crystal lattice is shown as a hexagonal system.

Figure 3:
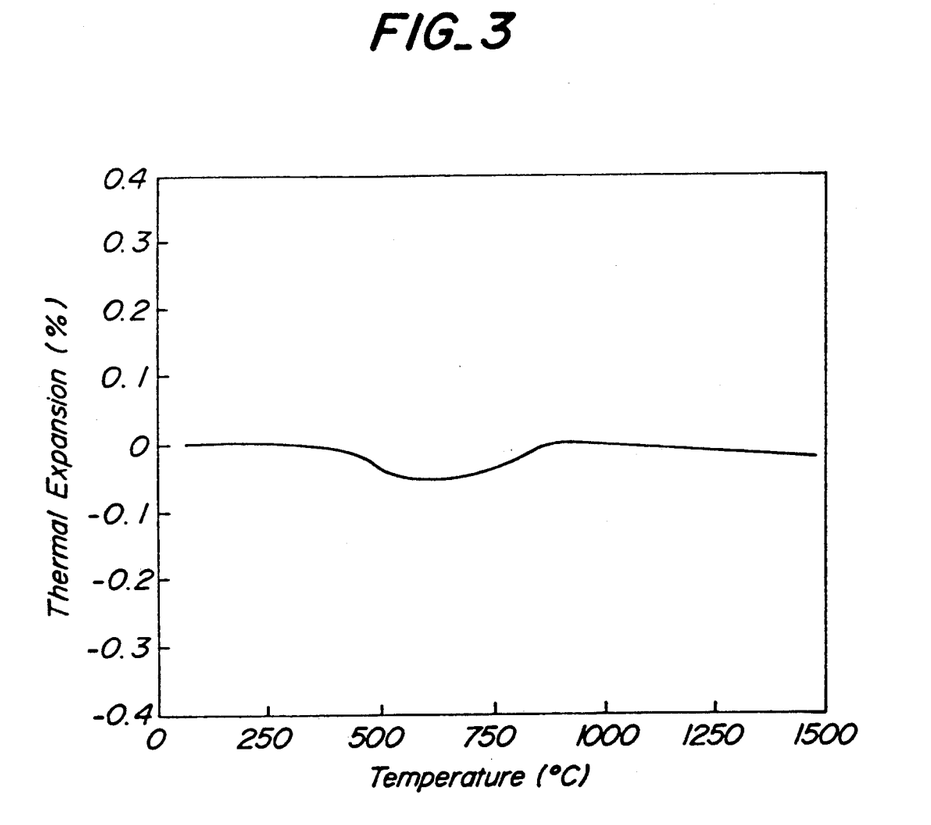
FIG. 3 shows a thermal expansion curve from 40° C. up to 1,400° C. of the sintered body obtained by Example 1.
Figure 4:
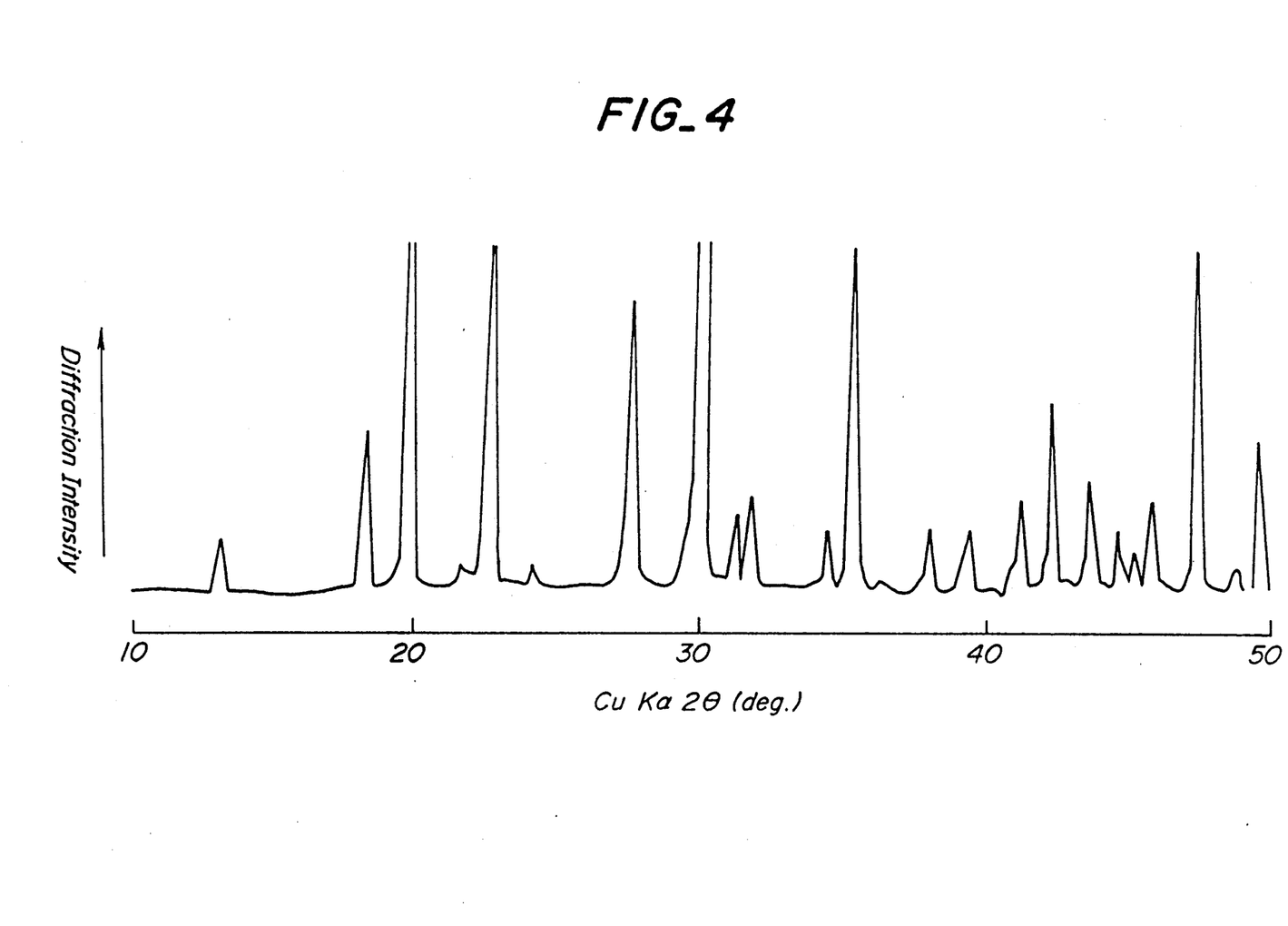
FIG. 4 shows a powder X-ray diffraction pattern at room temperature of the sintered body obtained by Example 1.
Figure 5:
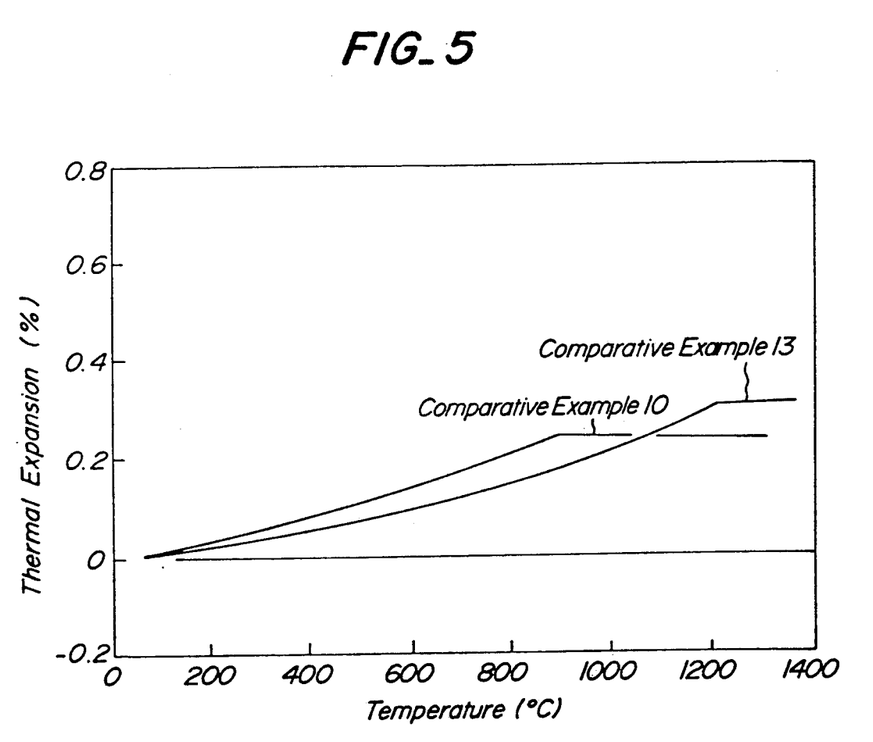
FIG. 5 shows thermal expansion curves from 40° C. up to 1,400° C. of the sintered bodies obtained by Comparative Examples 10 and 13.

FIG. 3 shows a thermal expansion curve from 40° C. up to 1,400° C. of the sintered body obtained by Example 1, from which it is understood that the sintered body exhibits extremely low thermal expansion. FIG. 4 shows a powder X-ray diffraction pattern at room temperature of the sintered body obtained by Example 1. Alternatively, FIG. 5 shows thermal expansion curves from 40° C. up to 1,400° C. of the sintered bodies obtained by Comparative Examples 10 and 13, from which it is understood that the thermal expansion increases with the temperature increase.

As explained above, according to the processes of the present invention for manufacturing phosphate compounds and sintered bodies thereof, heat resistant and low expansion phosphate compounds and sintered bodies thereof having an average thermal expansion coefficient at room temperature up to 1,400° C. of $-10 \sim +10 \times 10^{-7}$/° C. and a high temperature type crystalline structure having $R\bar{3}c$ symmetry at room temperature can be obtained by keeping a sintered body having a composition of $RZr_4P_6O_{24}$ (R is one or more cations of IIa group in the periodic table) at a high temperature of not lower than the temperature of phase transition between the high temperature type and the low temperature type, followed by quenching.

What is claimed is:

1. A phosphate compound comprising composition of $RZr_4P_6O_{24}$ wherein R is one or more cations of group IIa in the periodic table; an average thermal expansion coefficient between room temperature and 1,400° C. of $-10 \sim +10 \times 10^{-7}$/° C.; and a high temperature crystalline structure having $R\bar{3}c$ symmetry at room temperature.

2. The compound according to claim 1, wherein R is barium cation.

3. The compound according to claim 1, wherein R is strontium cation.

4. A heat resistant phosphate sintered body comprising at least one phosphate compound as a main crystalline phase, said at least one phosphate compound comprising: a composition of $RZr_4P_6O_{24}$, wherein R is one or more cations of group IIa in the periodic table; an average thermal expansion coefficient between room temperature and 1,400° C. of $-10 \sim +10 \times 10^{-7}/°$ C.; and a high temperature crystalline structure having $R\bar{3}c$ symmetry at room temperature.

5. The sintered body according to claim 4, wherein R is barium cation.

6. The sintered body according to claim 4, wherein R is strontium cation.

7. The sintered body according to claim 4, wherein said sintered body is heated at a temperature of not less than a temperature of phase transition between a high temperature and a low temperature crystal structure and then quenched at a quenching rate of at least 400° C./min.

8. The sintered body according to claim 7, wherein said high temperature crystalline structure is present in an amount of at least 60%.

9. The sintered body according to claim 4, wherein said sintered body is heated at a temperature of not less than a temperature of phase transition between a high temperature and a low temperature crystal structure and then quenched at a quenching rate of at least 1000° C./min.

10. The sintered body according to claim 9, wherein said high temperature crystalline structure is present in an amount of at least 70%.

11. The sintered body according to claim 9, wherein said high temperature crystalline structure is present in an amount of 100%.

* * * * *